United States Patent [19]
Etes

[11] 3,990,472
[45] Nov. 9, 1976

[54] CHECK VALVE
[75] Inventor: Donald E. Etes, Crystal Lake, Ill.
[73] Assignee: Northern Illinois Research, Inc., Wonder Lake, Ill.
[22] Filed: July 31, 1975
[21] Appl. No.: 600,809

[52] U.S. Cl. .......................................... 137/533.11
[51] Int. Cl.² ........................................ F16K 15/04
[58] Field of Search ............... 137/533.11, 533.13, 137/533.15, 539, 539.5, 269.5, 270.5; 251/367, 368

[56] References Cited
UNITED STATES PATENTS

| | | |
|---|---|---|
| 1,523,575 | 1/1925 | Beloit .................... 137/533.13 X |
| 1,901,217 | 3/1933 | Yelkes et al. ................ 137/533.13 |
| 2,274,968 | 3/1942 | O'Bannon ............... 137/533.13 X |
| 2,707,965 | 5/1955 | Allen .............................. 137/539 |

Primary Examiner—William R. Cline
Attorney, Agent, or Firm—Johnson, Dienner, Emrich & Wagner

[57] ABSTRACT

A valve in the nature of a check-valve for use in the fluid lines of enema and stoma-irrigating units, and the like, for permitting flow of material therethrough in one direction but not in the reverse direction, and which may be quickly and easily dissassembled, cleaned and re-assembled.

6 Claims, 5 Drawing Figures

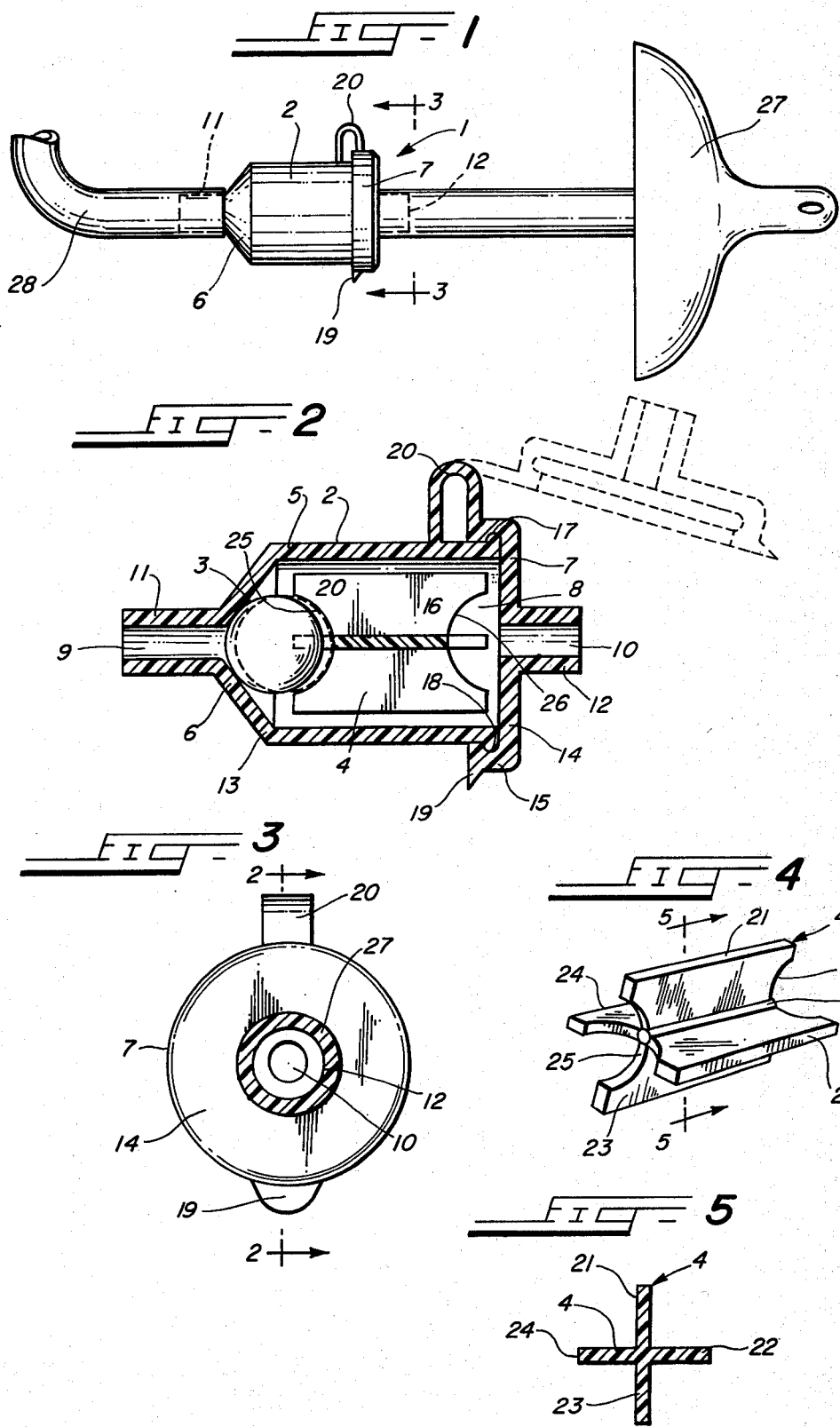

CHECK VALVE

BACKGROUND OF INVENTION

This invention relates to the valves, and, more particularly, to valves which are particularly well adapted for use in units used by ostomy patients for irrigating the stoma, and the like.

It is a primary object of the present invention to afford a novel valve.

Another object of the present invention is to afford a novel valve of the check-valve type.

In the treatment of people it is often necessary to feed a fluid, such as, for example, water into the bowel of the person such as, for example, during the administration of an enema or of a stoma-irrigation, and the like. Oftentimes during such treatment, because of contractions caused in the bowel, or the like, substantial back pressures are exerted from the bowel. Such back pressures are commonly of such magnitude that, if they are not contained or restricted in some manner, they can cause fluid and fecal matter to flow in a reverse direction to the enema or irrigation unit to such an extent as to cause overflowing thereof. This is particularly true when the treatment is being self-administered, or is being administered by a person who is not skilled in the administering of such treatments.

It is commonly necessary to irrigate the stoma of ostomy patients once, or more, each day. Such irrigation commonly is carried out by the patient, himself. If during such an irrigation treament such reverse flow of gases and fecal matter occurs in an unrestricted manner, it commonly causes the aforementioned overflowing of the irrigation unit, as well as causing the fouling and contamination of the entire unit. It is an important object of the present invention to enable such back pressures to be effectively contained in such a manner as to prevent such undesirable reverse flow of material.

Another object of the present invention is to afford a novel valve which may be used in the tubing of such an enema or irrigation unit, and which is effective to permit the desired flow of liquid from the unit into the bowel of a patient and to prevent the reverse flow therethrough of material from the bowel.

Another object of the present invention is to afford a novel valve of the aforementioned type which may be quickly and easily disassembled, cleaned and re-assembled even by unskilled persons.

A further object of the present invention is to afford a novel valve of the aforementioned type wherein the parts thereof are constituted and arranged in such a manner that it is substantially impossible to re-assemble the valve in the wrong manner after it has been disassembled.

Another object of the present invention is to afford a novel valve of the aforementioned type which is practical and efficient in operation, and which can be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I can contemplated applying these principles. Other embodiments of the invention embodying the same or equivclent principles may be used and structural changes may be made as desired by those skilled in the art without departing from the present invention and the purview of the appended claims.

SUMMARY OF THE INVENTION

This invention relates to a valve embodying a housing having a passageway therethrough for the flow of fluids through the housing, with a closure member mounted in the housing for preventing passage of such fluid through the passageway in one direction, and with an abutment member mounted in the passageway for restricting movement of the closure member out of the passageway-closing position thereof. In the preferred form of the invention the closure member and abutment member are both removable from the housing, and are so constructed and arranged as to render it virtually impossible to re-insert them in the housing in the wrong position.

DESCRIPTION OF THE DRAWINGS

In the drawings:

FIG. 1 is a partial, fragmentary elevational view of an enema or irrigation unit, which includes a valve embodying the principles of the present invention;

FIG. 2 is a longitudinal sectional view of the valve shown in FIG. 1;

FIG. 3 is an end elevational view looking in the direction of the arrows 3—3 in FIG. 2;

FIG. 4 is a perspective view of the abutment number embodied in the valve shown in FIG. 2; and FIG. 5 is a detail cross-sectionnal view taken substantilly along the line 5—5 in FIG. 4.

DESCRIPTION OF THE EMBODIMENT SHOWN HEREIN

A valve 1, embodying the principles of the present invention, is shown in the drawings to illustrate the presently preferred embodiment of the present invention.

As will be discussed in greater detail hereinafter, the valve 1 embodies, in general, an elongated housing 2 having a closure member 3 and an abutment member 4 removably mounted therein, FIG. 2, for a purpose which will be discussed in greater detail presently.

The housing 2 embodies an elongated, substantially, cylindrical-shaped tubular body portion 5 and two end portions 6 and 7 disposed at respective opposite ends of the body portion 5. The body portion 5 has a passageway 8 extending longitudinally therethrough, and the end portions 6 and 7 have openings or passageways 9 and 10 extending therethrough, respectively, in axial alignment with each other and with the passageway 8. The end portions 6 and 7 have nipples 11 and 12 projecting outwardly therefrom, respectively, in surrounding relation to the passageways 9 and 10, respectively, for a purpose which will be discussed in greater detail presently.

The end portion 6 of the housing 2 embodies a substantially frusto-conical portion 13 disposed between the nipple 11 and the body portion 5 of the housing 2, FIG. 2. In the assembled valve 1, the closure member 3 and the abutment member 4 are disposed in the body portion 5, with the closure member 3 disposed between the abutment member 4 annd the end portion 6 of the housing 2.

The housing 2, the closure member 3 and the abutment member 4 may be made of any suitable material, but preferably, are made from a suitable plastic material such as, for example, polyethylene or polypropylence by a suitable molding process, such as, for example, injection molding.

The end portion 7 of the housing 2 comprises a removable cover member for one end of the body portion 5. In the form shown in the drawings, FIG. 2, it embodies a substantially flat, circular body portion 14, from the central portion of which the nipple 12 extends, and from the peripheral edge of which an annular flange 15 extends in a direction opposite to that in which the nipple 12 extends.

In the assembled valve 1, the end portion or cover member 7 is revovably mounted on the end of the body portion 5 remote from the end portion 6. The internal size of the annular flange 15 preferably is such that it fits on an end portion 16 of the body portion 5 with a manually removable, but relatively snug force fit. The end portion 16 of the body portion 5 embodies an annular rib 17 extending around and projecting radially outwardly from the extreme outer end of the outer circumference of the end portion 16. An annular concavity 18, which is substantially complementary in size and shape to the rib 17 is formed in and extends around the inner annular surface of the annular member 15, immediately adjacent to the body portion 14 of the cover member 7. A lift tab 19 projects radially outwardly from the free edge portion of the annular member 15, FIGS. 2 and 3.

In the preferred form of the valve 1, the annular flange 15 is sufficiently plyable, and the tab 19 is of such length that the average adult person, by applying finger or thumb pressure to the tab 19 in a direction outwardly away from the end portion 6 of the housing 2 may readily dislodge the annular groove 18 from its's latched engagement with annular rib 17 and move the cover member 7 outwardly into open or uncovering relation to the end portion 16 of the body portion 5, as shown in broken lines in FIG. 2.

The end portion 7 and the body portion 5 are connected together by a hinge 20, FIGS. 2 and 3. In the preferred form of the valve 1 shown in the drawings, the housing 2 is of one-piece construction, and the hinge 20 comprises a strap of flexible material, such as, for example, the aforementioned polyethylene or polypropylene, which extends from the outer peripheral surface of the body portion 5 to the outer peripheral surface of the annular flange 15 of the end portion 7, at a position diametrically opposite the tab 19.

The ball or closure member 3 preferably is substantially round and is of such size that when it is disposed in engagement with the samll end portion of the portion 13 of the end portion 6 of the housing 2, as shown in solid lines in FIG. 2, it is effective to close the passage 9 at the inter-conection thereof with the passageway 8, for a purpose which will be discussed in greater detail presently.

The abutment member 4 of the valve 1 embodies an enlongated central body portion 20, from which four equally spaced flanges 21, 22, 23, and 24 project radially outwardly. The flanges 21–24 extend the entire length of the central body portion 20, and at each end of the latter, the ends of the each of the flanges 21–24 curve radially and axially outwardly from the body portion 20. The curvature of the ends of the flanges 21–24 is such that substantially semi-spherical concavities 25 and 26 are formed in the respective end faces of the abutment member 4. The diameters of the concavities 25 and 26 are greater than the diameter of the ball 3, and, preferably, are of such size that the ball 3 may be received in either one of the concavities 25 or 26 with a relatively snug, but freely removable fit.

In the assembled valve 2, the ball 3 annd abutment member 4 are disposed in the passageway 8, with the ball 3 disposed between the end portion 6 of the housing 2 and the abutment member 4, as shown in FIG. 2. The abutment member 4 preferably is of such lateral width that, in the assembled valve 1, it is disposed in the passageway 8 of the body portion 5 with a relatively snug, but freely slidable fit. Preferably, the abutment member 4 is of such length that, in the assembled valve 1, it is reciprocable longitudinally a relatively short distance, such as, for example, one-sixteenth of an inch between engagement with the respective end portions 6 and 7 of the housing 2.

When the abutment member 4 is disposed in abutting engagement with the end portion 6, as shown in FIG. 2, the concavity 25 or 26 which is disposed in immediately facing relation to the end portion 6, is spaced from the passageway 9, a sufficient distance that the ball 3 is movable between the aforementioned position shown in solid lines in FIG. 2, wherein it is effective to close the inner end of the passageway 9, and the position shown in broken lines in FIG. 2, wherein it is disposed in abutting engagement with the adjacent portion of the abutment member 4, within the aforementioned concavity 25 or 26. In this latter position, the ball 3 is disposed in spaced relation to the passageway 9 and the end portion 6 of the housing 2 so that communication is open between the passageway 8 and the passageway 9.

As previously mentioned, preferably, the abutment member 4 is of such length that it may reciprocate to a limited extent between the end portions 6 and 7 of the housing 2. However if desired, it may be of such length that, in the assembled valve 1, it simultaneously abuttingly engages the end portions 6 and 7. Even with this construction, because the abutment member 4 engages the portion 13 of the end portion 6 of the housing 2 outwardly of the ball 3, the adjacent end face of the abutment member 4 is spaced from the passagway 9 a sufficient distance that the ball 3 may move between the position shown in solid lines in FIG. 2 and a position spaced inwardly therefrom, so as to close and open communication, respectively, between the passageway 9 and the passageway 8.

In the preferred form of the valve 1, the ball 5 is of such diameter, and the abutment member 4 is of such length that if they are removed from the housing 2, and are subsequently reinserted therein, the cover 7 cannot be moved into closed position relative to the body portion 5 if the position of the ball 3 and the abutment member 4 relative to the nipple 11 is reversed from that shown in FIG. 2. Under such circumstances, the space afforded between the cover member 7 and the adjacent end of the abutment member 4, when the other end of the abutmennt member 4 is disposed in abutting engagement with the end portion 6 of the housing 5, is not sufficient to accomodate the ball 6 when the cover member 7 is disposed in closed position.

In the use of the valve 1, the nipple 12 may be directly connected to an enema tip or a stoma-irrigation tip, such as the tip 27 shown in FIG. 1, by mounting the inlet end of the tip 27 directly on the outer peripheral surface of the nipple 12. The nipple 11 at the other end of the valve 1 may be similarly connected to the free end of a tube, such as the tube 28 shown in FIG. 1, through which liquid is intended to flow into the tip 27 in the enema or stoma-irrigation apparatus. In this instance, the free end of the tube 28 may also be directly mounted on an outer peripheral surface of the nipple 11.

With the valve 1 thus mounted in an enema or stomairrigation apparatus, liquid may flow from the tube 28 through the passageway 9, past the ball 3, between the flanges 21-24 of the abutment member 4 in the passageway 8, and out through the passageway 10 into the tip 27 from which it may flow into the bowel or stoma of the patient. If, during such an operation, the back pressure in the bowel or stoma of the patient is such as to tend to cause reverse flow of liquid through the valve 1, this is effective to cause the ball 3 to move into seated relation with the end portion 6 of the housing 2 relative to the interconnection between passageways 8 and 9 and thus prevent the flow of liquid or fecal material into the tube 28 and the other portions of the enema or stoma-irrigation apparatus. Also, such closure of the valve 3 relative to the passageway 9 is effective to trap, within the housing 2 of the valve 1, any such material flowing from the bowel or stoma of a patient through the tip 27 into the valve 1.

When this occurs, the patient may close the tube 28 by a suitable clamp, not shown, and remove the tube 28 from the nipple 11, open the cover 7 of the valve 1, remove the ball 3 and the abutment member 4 from the housing 2 and flush out the latter. The ball 3 and the abutment member 4 may then be washed off, and reinserted in the housing 2. It will be remembered that the ball 3 and the abutment member 4 are so constituted and arranged that if, in reinserting them in the housing 2, the patient should insert them in reverse order, it will not be possible to close the cover member 7. Thus, it is insured that when the ball 3 and the abutment member 4 are being reinserted into the housing 2, they will be properly positioned so as to permit the flow of liquid through the valve 1 from the left to the right, but not from the right to the left, as viewed in FIG. 2. The ends 25 and 26 of the abutment member 4 preferably are of the same size and shape, so that it is immaterial whether the abutment member 4 is disposed in the housing 2 with the ends 25 and 26 facing the end portions 6 and 7, respectively, or in the reverse position.

It will be seen that with my novel valve 1 constructed in the aforementioned manner, it affords an effective, reliable check valve for permitting liquid to flow through an enema or stoma-irrigation unit in the proper direction, but not in the reverse direction.

Also, it will be seen that it affords a valve, which, if it becomes fouled by fecal material, or the like, can be easily and throughly cleaned even by unskilled persons.

In addition, it will be seen that it affords a valve which is substantially fool-proof in reassembly, after it has been taken apart for cleaning purposes, or the like, even when the reassembly is being performed by unskilled persons.

Also it will be seen that the present invention affords a novel valve which is practical and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as falls in the purview of the following claims.

I claim:
1. A valve comprising
  a. a housing having
    1. an elongated tubular body portion having a passageway extending longitudinally therethrough,
    2. an end portion on one end of said body portion and having an openinng therethrough in communication with said passageway, and
    3. another end portion on the other end of said body portion and having an opening therethrough in communication with said passageway,
  b. a closure member movably mounted in said passageway for movement axially thereof between
    1. one position wherein it is engaged with said first mentioned end portion in position to close said opening therethrough, and
    2. another position wherein it spaced from said first mentioned end portion and disposed out of position to close said opening therethrough, and
  c. an abutment member mounted in said passageway between said closure member and said other end portion in position to engage said closure member when the latter is disposed in said other position and thereby limit movement of said closure member from engagement with said first mentioned end portion toward said other end portion,
  d. one of said end portions comprising a cover member removably mounted on one end of said tubular member,
  e. said closure member and said abutment member being removable from said passageway through said one end of said tubular member when said cover member is removed from the latter,
  f. said closure member comprising a substantially round ball,
  g. said abutment member
    1. being mounted in said passageway with a freely slidable fit for movement axially thereof,
    2. leaving two oppositely disposed sides which are so disposed relative to each other that
      (a) when one of said sides is disposed in abutting engagement with said other end portion and said ball is disposed in said one position, the other of said sides is disposed in spaced relation to said ball, and
      (b) when said one side is disposed in abutting engagemennt with said other end portion and said ball is disposed in said other position, said other side is disposed in abutting engagement with said ball,
  h. said abutment member comprising
    1. an elongated body portion extending axially of said passageway, and
    2. a plurality of spaced fins projecting radially outwardly from said last mentioned body portion,
  i. each of said sides having a substantially semispherical concavity therein,
  j. the diameter of each said concavities being at least as large as that of said ball,
  k. said concavities being disposed in substantially axial alignment with each other and with said opening in said first mentioned end portion, and
    1. said cover member being hinged to said tubular body portion.
2. A valve as defined in claim 1, and in which a. said housing is of molded one-piece construction.
3. A valve as defined in claim 2, and in which a. each of said end portions includes an outwardly projecting nipple disposed in surrounding relation to said openinng through the respective one of said end portions.

4. A valve comprising
a. a housing having
  1. an elongated tubular body portion having a passageway extending longitudinally therethrough,
  2. an end portion on one end of said body portion and having an opening therethrough in communication with said passageway, and
  3. another end portion on the other end of said body portion and having an opening therethrough in communication with said passageway,
b. a closure member movably mounted in said passageway for movement axially thereof between
  1. one position wherein it is engaged with said first mentioned end portion in position to close said opening therethrough, and
  2. another position wherein it spaced from said first mentioned end portion and disposed out of position to close said opening therethrough, and
c. an abutment member mounted in said passageway between said closure member and said other end portion in position to engage said closure member when the latter is disposed in said other position and thereby limit movement of said closure member from engagement with said first mentioned end portion toward said other end portion,
d. one of said end portions comprising a cover member removably mounted on one end of said tubular member,
e. said closure member and said abutment member being removable from said passageway through said one end of said tubular member when said cover member is removed from the latter,
f. said closure member comprising a substantially round ball,
g. said abutment member
  1. being mounted in said passageway with a freely slidable fit for movement axially thereof,
  2. having two oppositely disposed sides which are so disposed relative to each other that
    (a) when one of said sides is disposed in abutting engagement with said other end portion and said ball is disposed in said one position, the other of said sides is disposed in spaced relation to said ball, and
    (b) when said one side is disposed in abutting engagement with said other end portion and said ball is disposed in said other position, said other side is disposed in abutting engagement with said ball,
h. said abutment member comprising
  1. an elongated body portion extending axially of said passageway, and
  2. a plurality of spaced fins projecting radially outwardly from said last mentioned body portion,
i. each of said sides having a substantially semi-spherical concavity therein,
j. the diameter of each said concavities being at least as large as that of said ball,
k. said concavities being disposed in substantially axial alignmennt with each other and with said opening in said first mentioned end portion, and
l. said abutment member and said ball being of such size that when said abutment member is disposed in abutting engagement with said first mentioned end portion, the space between said abutment member and said other end portion is less than that necessary to accomodate said ball.

5. A valve comprising
a. a housing having
  1. two oppositely disposed end portions
  2. an opening through each of said end portions for the passage of fluid therethrough, and
  3. a passageway interconnecting said openings for the passage of said fluid therebetween,
b. a closure member mounted in said passageway and movable
  1. into one position wherein it is enngaged with one of said end portions in position to close said opening therethrough and thereby prevent passage of said fluid through said opening in said one end portion, and
  2. out of said one position toward the other one of said end portions into another position spaced from said one end portion to thereby permit flow of said fluid through said opening in said one end portion, and
c. an abutment member mounted in said passageway in position to abuttingly engage said closure member when the latter is disposed in said other position and thereby restrict movement of said closure member from said one end portion toward said other end portion,
d. one of said end portions being removably mounted relative to said passageway,
e. said abutment member including a concave portion
  1. disposed in facing spaced relation to said closure member when the latter is disposed in said one position, and
  2. disposed in abutting engagement with said closure member when the latter is disposed in said other position,
f. said one end portion being hingedly connected to te remainder of said housing for swinging movement between covering and uncovering relation thereto, and
g. said closure member and said abutment member being removable from said passageway when said last mentioned one end portion is in said uncovering relation to said remainder of said housing.

6. A valve as defined in claim 5, and in which
a. when said abutment member is disposed between said first mentioned end portion and said ball, the space between said abutment member and said hingedly connected one end portion is less than that necessary to accomodate said ball if said hingedly connected end portion were disposed in said covering relation to said remainder of said housing.

* * * * *